US008025265B2

(12) United States Patent
Lee

(10) Patent No.: US 8,025,265 B2
(45) Date of Patent: Sep. 27, 2011

(54) STAND FOR FLAT-PANEL DISPLAY

(75) Inventor: Chang Su Lee, Gyeongsangbuk-do (KR)

(73) Assignee: LG Electronics Inc., Seoul (KR)

( * ) Notice: Subject to any disclaimer, the term of this patent is extended or adjusted under 35 U.S.C. 154(b) by 247 days.

(21) Appl. No.: 12/411,151

(22) Filed: Mar. 25, 2009

(65) Prior Publication Data
US 2009/0179126 A1 Jul. 16, 2009

Related U.S. Application Data

(63) Continuation of application No. 11/492,071, filed on Jul. 25, 2006, now Pat. No. 7,520,480.

(30) Foreign Application Priority Data

Jul. 29, 2005 (KR) ........................ 10-2005-0069419

(51) Int. Cl.
E04G 3/00 (2006.01)
(52) U.S. Cl. .................. 248/291.1; 248/288.51; 248/917
(58) Field of Classification Search .................. 248/917, 248/923, 371, 372.1, 393, 397; 16/258, 300; 361/679.06, 679.02
See application file for complete search history.

(56) References Cited

U.S. PATENT DOCUMENTS

| | | | |
|---|---|---|---|
| 4,085,962 A | 4/1978 | Wahls | |
| 4,407,045 A | 10/1983 | Boothe | |
| 4,474,264 A | 10/1984 | Krause | |
| 4,666,327 A | 5/1987 | Su | |
| 4,770,559 A | 9/1988 | Yoo | |
| 5,697,588 A | 12/1997 | Gonzalez et al. | |
| 5,751,548 A | 5/1998 | Hall et al. | |
| 5,992,566 A | 11/1999 | Yeh | |
| 6,354,552 B1 | 3/2002 | Chiu | |
| 6,581,893 B1 | 6/2003 | Lu | |
| 6,676,098 B2 | 1/2004 | Lin | |
| 6,688,572 B2 | 2/2004 | Huang et al. | |
| 7,114,218 B1 | 10/2006 | Lin | |
| 2003/0122046 A1 | 7/2003 | Huong | |

FOREIGN PATENT DOCUMENTS

CN 2620917 Y 6/2004

*Primary Examiner* — Amy J Sterling
(74) *Attorney, Agent, or Firm* — Birch, Stewart, Kolasch & Birch, LLP

(57) ABSTRACT

A stand for a display device, such as a flat-panel display, selectively accommodates mounting surfaces having disparate orientations with improved stability and durability, to facilitate viewing of the flat-panel display in either of at least two physical states of orientation as necessary or desired, specifically, with respect to both horizontal and vertical mounting surfaces. The stand includes a pivoting arm for receiving the display device, the pivoting arm including a locking member having at least two locking devices; a support arm for receiving a base; and a locking release coupled to the pivoting arm by a pivot pin and coupled to the support arm by a releasing pin for loading an elastic member, the locking release including a lever having an upper end for receiving the pivot pin and a lower end for receiving the releasing pin and compressing the elastic member, the upper end including a set of locking devices formed in correspondence to the at least two locking devices of the locking member to enable a selective engagement between one of the locking devices of the lever and one of the locking devices of the locking member.

8 Claims, 3 Drawing Sheets

STAND FOR FLAT-PANEL DISPLAY

This application is a continuation of U.S. application Ser. No. 11/492,071, filed Jul. 25, 2006, which claims the benefit of Korean Patent Application No. 10-2005-0069419, filed on Jul. 29, 2005, now U.S. Pat. No. 7,520,480 which is hereby incorporated by reference as if fully set forth herein.

BACKGROUND OF THE INVENTION

1. Field of the Invention

The present invention relates to a stand structure, and more particularly, to a stand for supporting the display device of a flat-panel display. Although the present invention is suitable for a wide scope of applications, it is particularly suitable for a flat-panel display enabling an adjustable configuration with respect to a desktop or wall mount environment.

2. Discussion of the Related Art

Display devices, including flat-panel displays such as those for displaying video images and other data output, are viewable by a user (viewer) positioned is front of a screen. Though the user is most typically seated at a desk, viewing may be desirable under a variety of circumstances. For example, a flat-panel display may be arranged on a surface of another orientation, such as an interior wall of a room. Therefore, the flat-panel display should include a stand enabling more than one viewing angle. That is, the stand may be adjustable and may permit a range of movement of 90 degrees or more, to enable the flat-panel display to be placed on a desk (i.e., a horizontal surface) or be hung on a wall (i.e., a vertical surface).

Referring to FIG. 1, a contemporary stand for supporting a display device, e.g., a flat-panel display, as described above is basically comprised of a pivoting arm 101 coupled to a support arm 102. The pivoting arm 101 is configured to receive the display device to be supported and to transfer its weight to the support arm. For example, the pivoting arm 101 may enable a rotational coupling to a rear side of the display device, allowing a rotational movement of the display device with respect to the support arm 102. Meanwhile, the support arm 102 is coupled at one end (e.g., an upper end) to the pivoting arm 101 and is configured at its other end (e.g., a lower end) to be fixed to a base (not shown), to thus support the display device at a predetermined height, or distance, with respect to the base.

The pivoting arm 101 comprises a support body 103, including at least one first support link 103a corresponding to the rear side of the display device and at least one second support link 103b connected at one end (e.g., a mounting end) to the first support link. A chamfered hole 103bb is formed in the other end (e.g., a pivot end) of the second support link 103b to receive a pivot pin 105. A first boss 102a for receiving the pivot pin 105 is disposed at the upper end of the support arm 102 and is arranged adjacent to the pivot end of the second support link 103b. An annular device 104 having a set of locking recesses 104a arranged around its perimeter and receiving the pivot pin 5 is provided on a side of the first boss 102a of the support arm 102, to be interposed between the first boss and the pivot end of the second support link 103b. A second boss 106 is fixed to an inner wall of the support arm 102 and securely receives a releasing pin 107. A retractable lever 108 is fixed at a lower end to the releasing pin 107, using a securing clip 109, and has a tapered distal end 108b for selectively engaging with one of the locking recesses 104a. The retractable lever 108 may be selectively inserted into a slotted opening 102b, which is formed lengthwise in a sidewall of the support arm 102, to extend roughly from the releasing pin 107 to the annular device 104, and includes at one end a seat 108a for receiving the releasing pin.

Here, it should be appreciated that, with the support arm 102 assembled to the pivot arm 101, the base may be aligned with and then securely coupled to the lower end of the support arm 102. Meanwhile, the first support link 103a of the pivot arm 101 may likewise be aligned with and then securely coupled to the display device itself. Thus, the stand may, according to the orientation (arrangement) of the display device, be manually adjusted to facilitate viewing.

For example, for viewing when the display device is arranged on a desktop or other mounting surface, the releasing pin 107 is pressed to enable the retractable lever 108 to slide outwardly along the length of the releasing pin and thus emerge from the slotted opening 102b, to thereby disengage with the corresponding locking recess 104a of the annular device 104, allowing a manual rotation of the support body 103 of the pivoting arm 101 according to a desired viewing with respect to the mounting surface. In doing so, the releasing pin 107 loads a spring (not shown) fitted to the releasing pin, between the second boss 106 and the retractable lever 108. Once the desired viewing angle is obtained manually, the retractable lever 108 is reengaged with another locking recess 104a of the annular device 104. A release of the releasing pin 107 causes, under a restoring force of the spring, the retractable lever 108 to retract into the slotted opening 102b and thereby secure the engagement with the locking recess 104a and the corresponding viewing angle. The same adjustment process may be followed for a display device being moved from the desktop to a wall or back again.

According to the contemporary stand as described above, however, the retractable lever 108 is easily separated from the locking recess 104a of the annular device 104, due to the nature of the tapered distal end 108b. Moreover, the weight of the display device is applied, via the pivoting arm 101, to the retractable lever 108 and is concentrated on the tapered distal end 108b, which is susceptible to fracturing.

SUMMARY OF THE INVENTION

Accordingly, the present invention is directed to a stand for a flat-panel display that substantially obviates one or more problems due to limitations and disadvantages of the related art.

An object of the present invention is to provide a stand for a flat-panel display, which selectively accommodates mounting surfaces having disparate orientations with improved stability and durability.

Another object of the present invention is to provide a stand for a flat-panel display, which facilitates use of the flat-panel display by enabling viewing of the flat-panel display in either of at least two physical states of orientation as necessary or desired, specifically, with respect to both horizontal and vertical mounting surfaces.

Another object of the present invention is to provide a stand for a flat-panel display, which prevents inadvertent disassembly or disengagement of assembled components of the stand, specifically including engaged elements of a retractable lever and a locking member.

Another object of the present invention is to provide a stand for a flat-panel display, which prevents fracturing of components of a support arm, specifically including an engaged element of a retractable lever.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages in accordance with the purpose of the invention, as embodied and broadly described herein, there is provided a stand for a display device such as a flat-panel display. The stand comprises a pivoting arm for receiving the display device, the pivoting arm including a locking member having at least two locking devices; a support arm for receiving a base; and a locking release coupled to the pivoting arm by a pivot pin and coupled to the support arm by a releasing pin for loading an elastic member, the locking release including a lever having an upper end for receiving the pivot pin and a lower end for receiving the releasing pin and compressing the elastic member, the upper end including a set of locking devices formed in correspondence to the at least two locking devices of the locking member to enable a selective engagement between one of the locking devices of the lever and one of the locking devices of the locking member.

According to another aspect of the present invention, there is provided a flat-panel display including a stand for supporting a display device. The stand comprises a pivoting arm including: at least one support body having a first support link and a second support link, the first support link coupled to the display device and the second support link being fixed to the first support link; a locking member having at least two locking devices; and a pivot pin passed through the locking member to be fitted into the second support link; a support arm including: a support column having a first boss for receiving the pivot pin; and a sidewall provided to at least one side of the support column and having an opening; a locking release including: a second boss disposed in opposition to the opening of the sidewall; a releasing pin received by the second boss to enable a movement within the second boss at a predetermined stroke; an elastic member having one end elastically supported by the second boss; and a lever having an upper end for receiving the pivot pin and a lower end for receiving the releasing pin and compressing the elastic member, the upper end including a set of locking devices formed in correspondence to the at least two locking devices of the locking member to enable a selective engagement between one of the locking devices of the lever and one of the locking devices of the locking member; and a base coupled to a lower end surface of at least one of the support column and the sidewall.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to exemplary embodiments of the present invention, examples of which are illustrated in the accompanying drawings. Wherever possible, like reference designations will be used throughout the drawings to refer to the same or similar parts.

Figure 1:
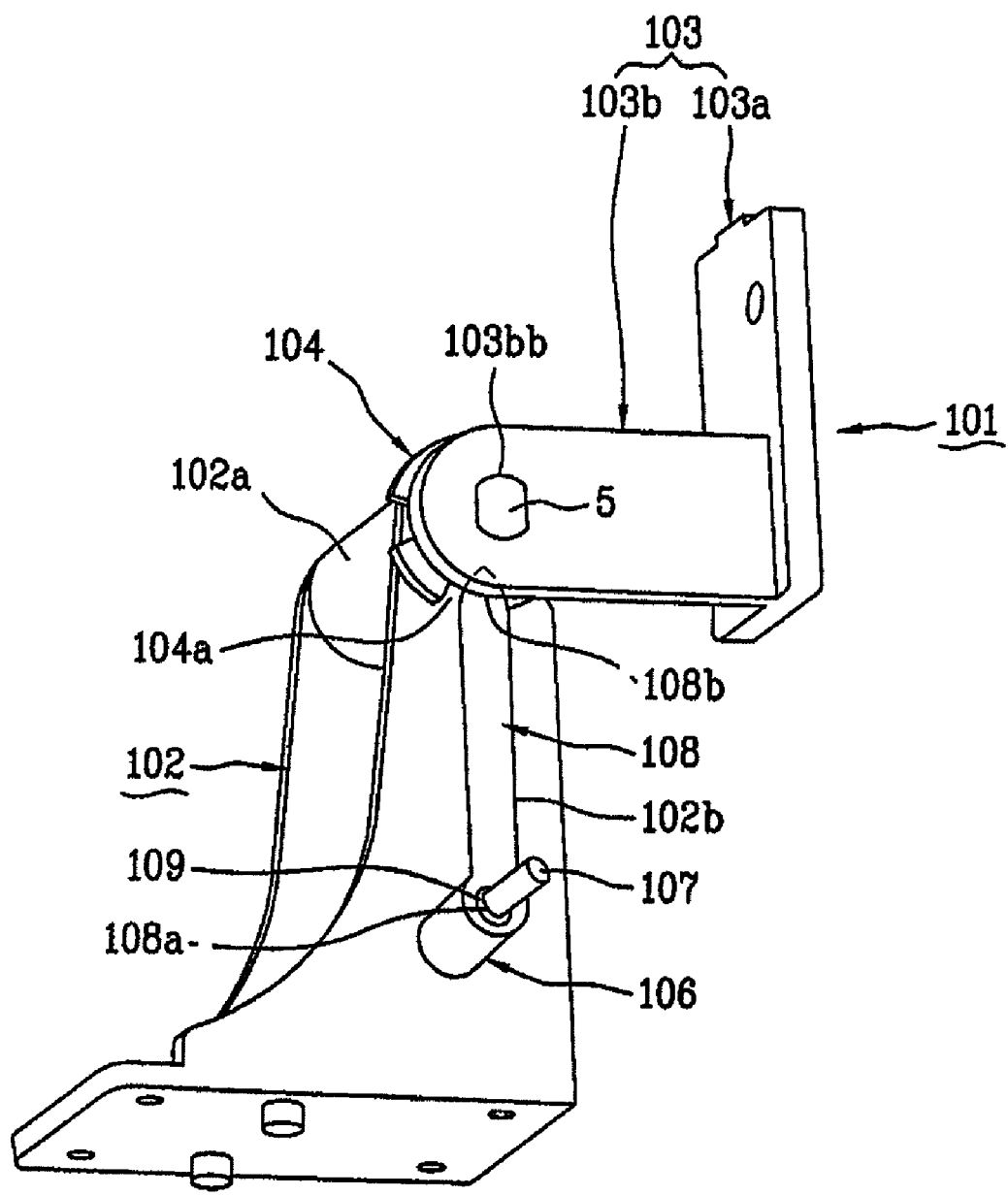
FIG. 1 is a perspective diagram of a stand for a flat-panel display according to a related art.
Figure 2:
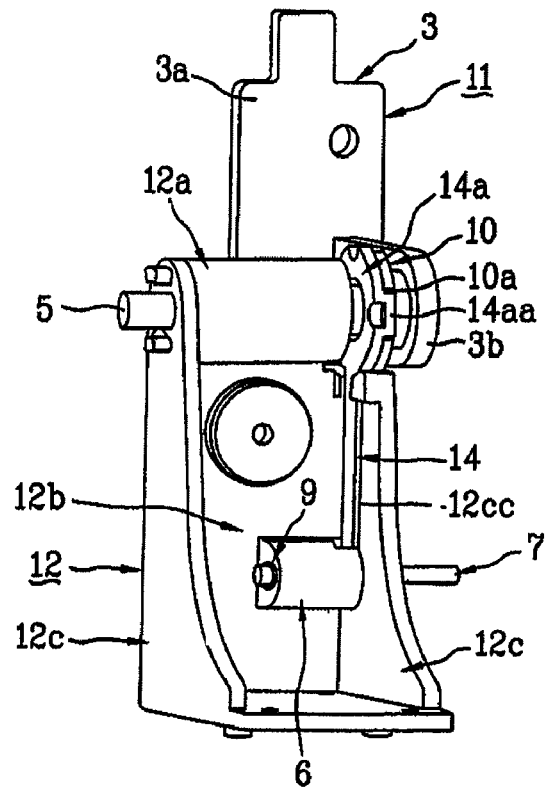
FIG. 2 is a perspective diagram of a stand for a flat-panel display according to the present invention.
Figure 3:
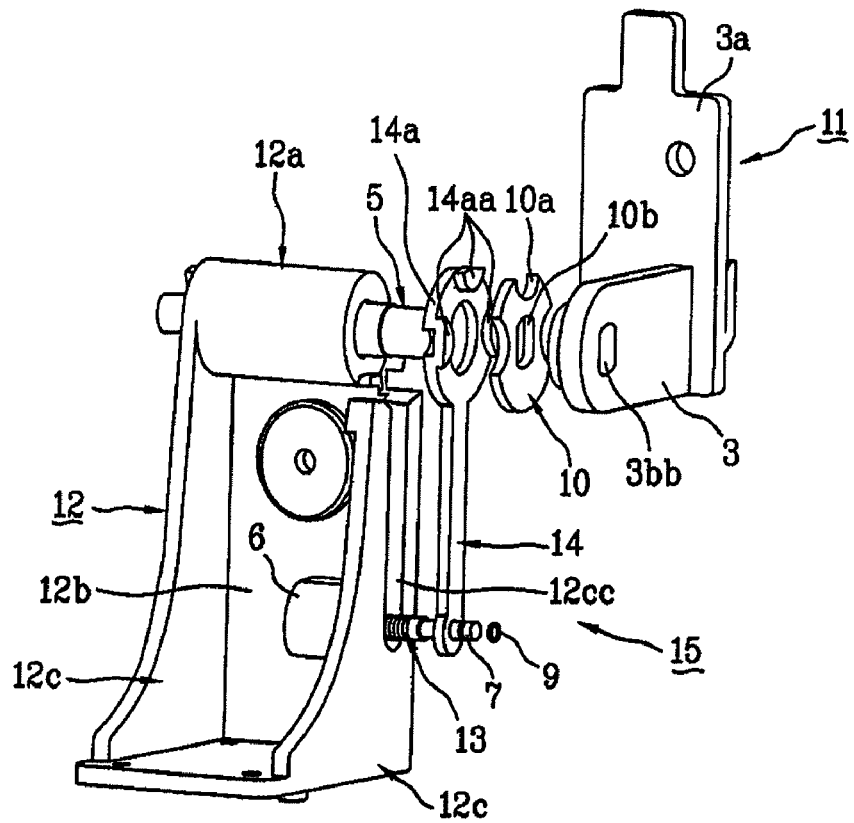
FIG. 3 is an exploded perspective diagram of the stand of FIG. 2.
Figure 4:
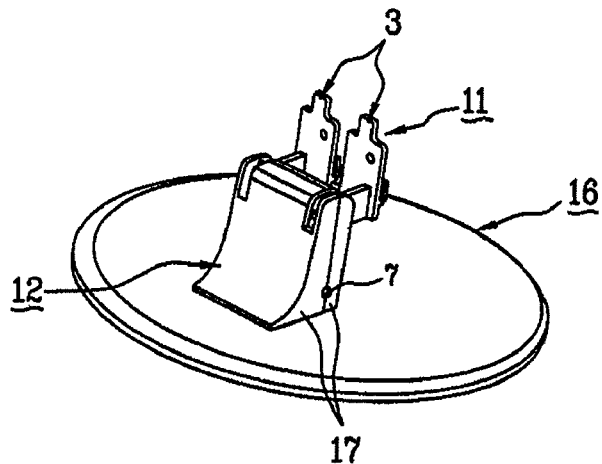
FIG. 4 is a perspective diagram of a stand for a flat-panel display according to the present invention, showing the stand fixed to a base.
Figure 5:
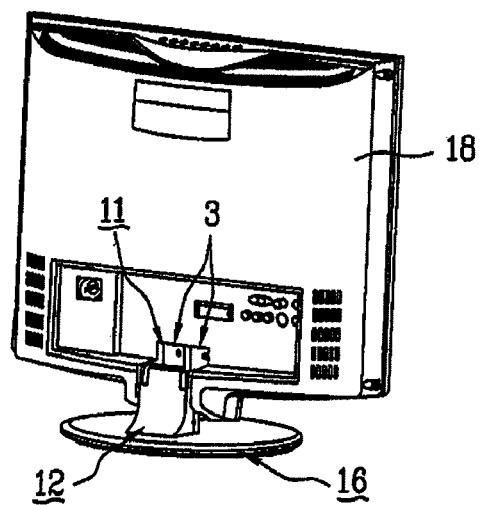
FIG. 5 is a perspective diagram of a stand for a flat-panel display according to the present invention, showing the stand configured to enable the flat-panel display to be placed on a horizontal surface, e.g., a desktop.
Figure 6:
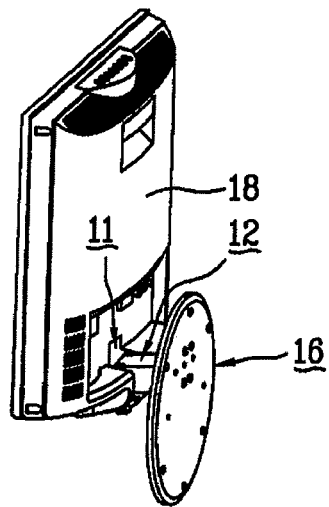
FIG. 6 is a schematic perspective diagram of a stand for a flat-panel display according to the present invention, showing the stand configured to enable the flat-panel display to be hung on a vertical surface, e.g., a wall.

Referring to FIGS. 2 and 3, a stand for a flat-panel display according to the present invention includes a pivoting arm 11, a support arm 12, and a locking release 15. In an exemplary embodiment, a base 16 is provided to the support arm 12 as shown in FIGS. 4-6.

The pivoting arm 11 includes at least one support body 3 having a first support link 3a to enable coupling to a rear-side assembly surface (not shown) of a display device and a second support link 3b integrally formed with one side of the first support link, a locking member 10 provided adjacent to the second support link 3b, and a pivot pin 5 passing through the locking member to be fitted to the second support link. According to the present invention, the locking member 10 includes at least two locking recesses 10a formed in a perimeter of the locking member, which may be integrally formed with the second support link 3b or may be provided as a discrete component subsequently fixed to the second support link. In the event that the locking member 10 is provided separate from the second support link 3b, a though-hole 10b is centrally formed in the locking member 10.

The support arm 12 includes a support column 12b having a first boss 12a for receiving the pivot pin 5 and a sidewall 12c in which a slotted opening 12 cc is formed to be oriented substantially lengthwise. The sidewall 12c is provided to at least one side of the support column 12b.

The locking release 15 includes a second boss 6 disposed in opposition to one end of the slotted opening 12cc, a releasing pin 7 fitted into a hole (not shown) formed in the second boss to enable a movement of the releasing pin within the hole at a predetermined stroke while projecting outwardly from a side surface of the sidewall 12c, an elastic member 13 fitted over an outer circumference of the releasing pin, and a retractable lever 14 having at its upper end an annular engagement device 14a for receiving the pivot pin 5 and a lower end for receiving the releasing pin 7 and compressing the elastic member 13. Thus, the slotted opening 12cc is formed in the sidewall 12c, from a lower point corresponding to the releasing pin 7 to an upper point corresponding to the annular engagement device 14a of the retractable lever 14, and includes at the lower end a seat for receiving the releasing pin.

According to the present invention, the annular engagement device 14a includes a set of locking nodules 14aa arranged on a perimeter of the annular engagement device in correspondence to the locking recesses 10a of the locking member 10, each locking nodule enabling a selective engagement with at least one of the at least two locking recesses and the retractable lever 14 having at least one portion accommodated in the slotted opening 12cc. Here, it should be appreciated that the locking member 10 may be provided with nodules for engaging with recesses formed in the annular engagement device 14a. In either case, there is an increase in the contacting surface area between the engaging elements of the locking devices (nodules or recesses) of the locking release 15 according to the present invention as compared to contemporary stands, so that fracturing may be prevented and so that stability is enhanced.

The elastic member 13 of the locking release 15 may include a coil spring as shown in the drawings, or may be realized as a plate spring. Such a plate spring may be variously configured provided that the plate spring be elastically supported by the second boss 6 at one end and by a correspondent portion of the retractable lever 14 at the other end. For example, the elastic member 13 may be embodied as a substantially C-shaped plate spring or as a plate spring made of a series of curves (ripples). Meanwhile, the second boss 6 of the locking release 15 may be substantially semi-cylindrical or rectangular in shape and may be integrally formed with the support arm 12 or may be provided as a discrete component subsequently fixed to the support arm.

A securing clip 9, in the form of a C-type or E-type annular fastener, may be fitted into a groove (not shown) formed in at least one side of the releasing pin 7, which is secured after fitting to the lower end of the retractable lever 14 and projects outwardly from a side surface of the sidewall 12c. Similar fasteners (not shown) may be provided for securing the pivot pin 5 within the first boss 12a, for securing the pivot pin 5 within the second boss 6, or for securing the locking member 10 to the second support link 3b.

To assembly the stand for a flat-panel display according to the present invention, after the pivot pin 5 and the releasing pin 7 are fitted into the first and second bosses 12a and 6, respectively, one end of each pin is secured with a corresponding clip (not shown). The elastic member 13 is then fitted over the releasing pin 7. Exposed ends of each of the pivot pin 5 and the releasing pin 7 are fitted to opposite ends of the retractable lever 14. For example, the pivot pin 5 is passed through the annular engagement device 14a, while the releasing pin 7 is passed though a fitted opening formed in the lower end of the retractable lever 14. Once so engaged with the respective pins, the retractable lever 14 is pushed into the slotted opening 12cc of the sidewall of the support arm 12 and is thereafter secured by fitting the securing clip 9 to the exposed end of the releasing pin 7. In the event that the locking member 10 is provided separate from the second support link 3b, the though-hole 10b of the locking member 10 is aligned with the chamfered hole 3bb of the second support link 3b of the pivoting arm 11, and then the locking member is fixed to the second support link. Another securing clip (not shown) may be used to secure the pivot pin in the second support link 3b including the locking member 10.

For protecting the inner assembly as above and more specifically to protect the locking release 15, a pair of aesthetic outer covers 17 may be fitted as shown in FIG. 4, to be respectively disposed on either (e.g., forward and rearward) side of the support arm 12. Though not specifically shown in the drawings, a fixing structure may be provided to one or both of the aesthetic outer covers 17 or to an underlying component of the support arm 12.

Finally, the display device 18 is positioned in front of the support body 3 of the pivoting arm 11, specifically aligning with mounting holes formed in the first support link 3a, which is then coupled to the rear-side assembly surface of the display device. Before being able to use the display device 18, the base 16 is arranged under, and then coupled to, the lower end of the support arm 12. Here, it should be noted that assembly of the base 16 to the support arm 12 is preferably performed before coupling the display device 18 to the pivoting arm 11, but it should also be appreciated that the present invention may utilize as a base some other mounting surface, for example, a wall or similarly permanent structure.

To manipulate the stand of the present invention and thereby to enable selective use of the fully assembled flat-panel display according to a desired viewing orientation, the base 16 may be placed on a desktop or hung (mounted) on a wall. A desktop configuration is shown in FIG. 5, and a wall-mounted configuration is shown in FIG. 6.

To adjust between desktop and wall-mounted configurations, the releasing pin 7 is first pressed inwardly, i.e., toward the side surface of the sidewall 12c, to cause the engaged locking nodule 14aa of the annular engagement device 14a of the retractable lever 14, which is interoperating with the releasing pin 7, to be separated (disengaged) from the corresponding locking recess 10a of the locking member 10 adjacent the second support link 3b of the pivoting arm 11. Subsequently, namely, after manually rotating the display device 18 with respect to the base 16 to be substantially parallel (FIG. 5) or substantially perpendicular (FIG. 6) to the support arm 12, the releasing pin 7 is released (depressed) so that the retractable lever 14 returns to its original position to thereby cause the corresponding locking nodule 14aa to engage with the desired locking recess 10. After secured engagement as above, a tilt or viewing angle of the display device 18 can be conveniently adjusted, within a predetermined range, using the releasing pin 7 to vary the locking nodule 14aa corresponding to the locking recess 10a.

By adopting the present invention, mounting surfaces can be selectively accommodated with improved stability and durability for facilitated use of a flat-panel display having a stand according to the present invention, by enabling viewing of the flat-panel display in either of two physical states of orientation as necessary or desired, namely, with respect to a horizontal surface, e.g., placement on a table top, and with respect to a vertical surface, e.g., hanging on a wall. Unless there is a conscious effort by the user to perform a complete disassembly of the related components, it is difficult to physically separate the locking device of the retractable lever of the support arm from the locking device of the second support link of the pivoting arm, even during an adjustment of the viewing angle of the display device with respect to the support arm of the stand. Even though, in transferring the weight of the display device to the support arm via the pivoting arm, the weight may become concentrated on the locking means of the retractable lever, the present invention prevents the locking device from fracturing.

It will be apparent to those skilled in the art that various modifications can be made in the present invention without departing from the spirit or scope of the invention. Thus, it is intended that the present invention covers such modifications provided they come within the scope of the appended claims and their equivalents.

What is claimed is:
1. A stand for a display device, the stand comprising:
  a pivoting arm coupled to the display device;
  a support arm coupled to a base; and
  a lever having an upper end and a lower end, the upper end detachably coupled to the pivoting arm and the lower end coupled to the support arm, the upper end of the lever receiving a pivot pin for rotatably coupling the lever with the pivoting arm, and the lower end of the lever receiving a releasing pin for coupling the lever with the support arm, wherein the upper end of the lever comprises an annular engagement device penetrated by the pivot pin fixed to the support arm and coupled with the pivoting arm.

2. The stand of claim 1, wherein an elastic member is provided to the releasing pin, and the lower end of the lever is supported by the elastic member.

3. The stand of claim 1, the annular engagement device of the lever having one of locking protrusions and locking recesses, and the pivoting arm having the other.

4. The stand of claim 3, wherein a locking member is provided to the pivoting arm, the locking protrusions or locking recesses being provided to the locking member.

5. The stand of claim 4, wherein the locking recesses are formed at a boundary of the locking member or the annular engagement device.

6. The stand of claim 4, wherein the support arm includes a support column having a boss for receiving the pivot pin, and a sidewall in which a slotted opening is formed to be oriented substantially lengthwise, and wherein a second boss is provided at one end of the slotted opening for receiving the releasing pin.

7. The stand of claim 6, wherein the lever has at least one portion accommodated in the slotted opening.

8. The stand of claim 7, wherein the lower end of the lever is accommodated in the slotted opening and the locking member is separated with the annular engagement device in the event that the lever is pushed by pressing the releasing pin.

* * * * *